US010809967B2

(12) United States Patent
Son

(10) Patent No.: US 10,809,967 B2
(45) Date of Patent: Oct. 20, 2020

(54) ANALOG/DIGITAL AUDIO CONVERTER AND A METHOD THEREOF

(71) Applicant: SAMSUNG ELECTRONICS CO., LTD., Suwon-si, Gyeonggi-do (KR)

(72) Inventor: Tae-yong Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/390,190

(22) Filed: Dec. 23, 2016

(65) Prior Publication Data

US 2017/0109129 A1 Apr. 20, 2017

Related U.S. Application Data

(63) Continuation of application No. 14/590,336, filed on Jan. 6, 2015, now Pat. No. 9,557,959, which is a (Continued)

(30) Foreign Application Priority Data

Nov. 9, 2004 (KR) ........................ 10-2004-0090653

(51) Int. Cl.
*G06F 3/16* (2006.01)
*H04N 21/426* (2011.01)
*H04N 21/439* (2011.01)
*H04N 5/46* (2006.01)
*H04N 5/60* (2006.01)

(52) U.S. Cl.
CPC ............... *G06F 3/165* (2013.01); *H04N 5/46* (2013.01); *H04N 5/602* (2013.01); *H04N 21/42638* (2013.01); *H04N 21/4398* (2013.01)

(58) Field of Classification Search
CPC .......... G06F 3/165; H04N 5/46; H04N 5/602; H04N 21/42638; H04N 21/4398
See application file for complete search history.

(56) References Cited

U.S. PATENT DOCUMENTS 5,796,423 A * 8/1998 Robbins ................. H04H 40/27
348/729
6,192,427 B1 2/2001 Li et al.
(Continued)

FOREIGN PATENT DOCUMENTS

JP 11-164240 6/1999
JP 11-225292 8/1999
(Continued)

OTHER PUBLICATIONS

Harman Kardon, Inc., "AVR 630 Audio/Video Receiver Owner's Manual", copywrite 2003, Harman Kardon Inc., pp. 1-54.
(Continued)

*Primary Examiner* — Davetta W Goins
*Assistant Examiner* — Daniel R Sellers
(74) *Attorney, Agent, or Firm* — Staas & Halsey LLP

(57) ABSTRACT

An analog/digital audio converting apparatus enables listening to both digital and analog audio signals received from a digital receiving apparatus and analog audio signals input from an external source using the same receiver by providing a formatter capable of converting the analog audio signal into a digital audio signal with the digital broadcasting receiving apparatus.

21 Claims, 2 Drawing Sheets

Related U.S. Application Data continuation of application No. 11/116,287, filed on Apr. 28, 2005, now Pat. No. 8,954,171.

(56) References Cited

U.S. PATENT DOCUMENTS

| | | | |
|---|---|---|---|
| 6,263,503 B1 * | 7/2001 | Margulis | H04L 12/2812 |
| | | | 725/81 |
| 6,490,001 B1 | 12/2002 | Shintani et al. | |
| 6,741,293 B1 | 5/2004 | Obuchi | |
| 6,772,354 B2 | 8/2004 | Takenaka et al. | |
| 7,233,781 B2 | 6/2007 | Hunter et al. | |
| 7,260,308 B2 | 8/2007 | Engle et al. | |
| 7,436,457 B2 | 10/2008 | Lee et al. | |
| 7,502,073 B2 | 3/2009 | Umesako | |
| 7,646,968 B1 | 1/2010 | Wang et al. | |
| 2001/0009548 A1 | 7/2001 | Morris | |
| 2002/0057893 A1 * | 5/2002 | Wood | H04N 5/4401 |
| | | | 386/355 |
| 2002/0095689 A1 | 7/2002 | Novak | |
| 2002/0174270 A1 * | 11/2002 | Stecyk | H04L 12/2805 |
| | | | 710/1 |
| 2003/0053798 A1 * | 3/2003 | Roshanski | H04N 5/76 |
| | | | 386/230 |
| 2003/0056221 A1 | 3/2003 | Zhang et al. | |
| 2004/0119893 A1 | 6/2004 | Burnworth | |
| 2004/0244033 A1 | 12/2004 | Ostensoe et al. | |
| 2005/0063418 A1 * | 3/2005 | Case | H04N 5/46 |
| | | | 370/466 |
| 2005/0166252 A1 | 7/2005 | Hallberg | |
| 2005/0237083 A1 * | 10/2005 | Bakker | G01K 7/015 |
| | | | 326/47 |
| 2006/0089735 A1 * | 4/2006 | Atkinson | H04R 5/04 |
| | | | 700/94 |
| 2008/0072272 A1 | 3/2008 | Robertson et al. | |

FOREIGN PATENT DOCUMENTS

| | | |
|---|---|---|
| JP | 2001-256694 | 9/2001 |
| JP | 2002-112145 | 4/2002 |
| JP | 2003-152574 | 5/2003 |
| JP | 2003-304461 | 10/2003 |
| KR | 20-262157 | 3/2002 |

OTHER PUBLICATIONS

Korean Office Action dated Jul. 28, 2006 in KR 2004-90653.
U.S. Notice of Allowance dated Oct. 1, 2014 in related U.S. Appl. No. 11/116,287.
U.S. Office Action dated Dec. 3, 2013 in related U.S. Appl. No. 11/116,287.
U.S. Office Action dated Apr. 22, 2013 in related U.S. Appl. No. 11/116,287.
U.S. Advisory Action dated Aug. 25, 2011 in related U.S. Appl. No. 11/116,287.
U.S. Office Action dated Apr. 25, 2011 in related U.S. Appl. No. 11/116,287.
U.S. Office Action dated Nov. 9, 2010 in related U.S. Appl. No. 11/116,287.
U.S. Office Action dated Aug. 18, 2010 in related U.S. Appl. No. 11/116,287.
U.S. Office Action dated Mar. 16, 2010 in related U.S. Appl. No. 11/116,287.
U.S. Office Action dated Sep. 22, 2009 in related U.S. Appl. No. 11/116,287.
U.S. Advisory Action dated Aug. 7, 2009 in related U.S. Appl. No. 11/116,287.
U.S. Office Action dated May 26, 2009 in related U.S. Appl. No. 11/116,287.
U.S. Office Action dated Nov. 25, 2008 in related U.S. Appl. No. 11/116,287.
U.S. Office Action dated Apr. 23, 2015 from U.S. Appl. No. 14/590,336.
U.S. Office Action dated Oct. 29, 2015 from U.S. Appl. No. 14/590,336.
U.S. Office Action dated Jul. 6, 2016 from U.S. Appl. No. 14/590,336.
U.S. Notice of Allowance dated Sep. 19, 2016 from U.S. Appl. No. 14/590,336.
U.S. Appl. No. 14/590,336, filed Jan. 6, 2015, Tae-yong Son, Samsung Electronics Co., Ltd.
U.S. Appl. No. 11/116,287, filed Apr. 28, 2005, Tae-yong Son, Samsung Electronics Co., Ltd.

* cited by examiner

ANALOG/DIGITAL AUDIO CONVERTER AND A METHOD THEREOF

CROSS-REFERENCE TO RELATED APPLICATIONS

This application is a continuation of U.S. application Ser. No. 14/590,336, filed on Jan. 6, 2015, which is a continuation of U.S. application Ser. No. 11/116,287 filed on Apr. 28, 2005, now U.S. Pat. No. 8,954,171, issued on Feb. 10, 2015, which claims the priority benefit under 35 U.S.C. § 119 of Korean Patent Application No. 10-2004-0090653, filed on Nov. 9, 2004, in the Korean Intellectual Property Office. The disclosures of all of the above applications are incorporated herein in their entirety by reference.

BACKGROUND OF THE INVENTION

1. Field of the Invention

The present general inventive concept relates to an analog/digital audio output apparatus. More particularly, the present general inventive concept relates to an audio output apparatus to enable reception of an analog audio signal in a digital broadcasting receiving apparatus through an external receiver.

2. Description of the Related Art

Audio signals received and processed in a digital broadcasting receiving apparatus comprise AC-3 and moving picture experts group (MPEG) data, which are decoded using a software codec capable of compressing and playing a digital audio signal processed by a digital signal processor (hereinafter, referred to as "digital audio DSP"), or without a dedicated hardware, and analog-processed to be output through a speaker. If being provided with a dedicated external audio/video (AV) receiver, a user can output the AC-3 and the MPEG data received through the digital broadcasting receiving apparatus as a digital signal without causing any loss of the data, connect the digital broadcasting receiving apparatus to the external A/V receiver, decode the digital signal at the digital audio DSP in the external A/V receiver and output the decoded signal through a speaker. Among digital audio interfaces for the above operations, a SONY®/PHILIPS® digital interface (SPDIF) is a prevailing one for domestic use.

The SPDIF has a digital output standard produced by SONY® corporation and ROYAL PHILIPS® Electronics, and FIG. 1 schematically shows a block diagram of a conventional digital broadcasting receiving apparatus for processing a digital output of the SPDIF. Referring to FIG. 1, the conventional digital broadcasting receiving apparatus mainly comprises a digital processing part and an analog processing part.

The digital processing part comprises a tuner 10 for receiving a channel from an external sky wave, a cable, and a satellite, a channel demodulator (demod) 20 for outputting a transport stream (TS) corresponding to the received channel, a multimedia processor 50 including a TS demultiplexer (demux), an MPEG decoder and a graphic mixer, a controller (CPU) 40 for controlling the overall system, and a digital audio DSP 60 for processing the digital audio. The multimedia processor 50 outputs an image as a video out signal, a super video (S-video) out signal, or a digital video interactive (DVI) signal.

The digital audio DSP 60 outputs the SPDIF output (digital out) to the outside or transmits a digital audio signal to a national television system committee (NTSC) audio decoder 70 so as to enable a user to listen to the digital audio signal through an external speaker.

In general, the conventional digital broadcasting receiving apparatus is able to receive and process conventional analog broadcasting. Here, an audio signal in such a conventional analog broadcasting is in accordance with the NTSC.

The analog processing part comprises an NTSC intermediate frequency (IF) converter or decoder 30 for converting the channel received by the tuner 10 into an IF signal and the NTSC audio decoder 70 for processing the NTSC audio signal, that is, the IF signal. Also, even an externally input audio signal is input to the NTSC audio decoder 70 so as to be processed to the left or the right according to a user's choice and transmitted as a L/R out signal to the external speaker. The NTSC IF converter 30 outputs an NTSC video signal to the multi-media processor.

In the conventional digital broadcasting receiving apparatus as described above, the NTSC audio signal is volume-controlled by the NTSC audio decoder 70, output to the left or the right and input to the speaker or other external devices, such as a video cassette recorder (VCR) for recording.

The user utilizing the external receiver (not shown) connects the SPDIF output from the digital audio DSP 60 of the digital broadcasting receiving apparatus to an input terminal of the external receiver and decodes the SPDIF in a digital audio DSP of the external receiver to thereby listen to the sound through the external speaker. Usually, volume of the conventional digital broadcasting receiving apparatus is set to '0' because the volume of the digital broadcasting receiving apparatus is turned down when receiving through the external receiver.

In a case of converting the channel to the NTSC signal or receiving the external input audio signal, such as from the VCR, the audio signal at this time is in the analog form, and therefore, the user needs to turn up the volume of the conventional digital broadcasting receiving apparatus to listen to the sound.

In other words, when the digital broadcasting receiving apparatus is receiving NTSC broadcasting or processing an input from the external VCR, the user who uses a separate receiver having the digital audio DSP suffers an inconvenience of turning up the volume of the conventional digital broadcasting receiving apparatus which is primarily set to '0', in order to listen to the sound through the external speaker.

SUMMARY OF THE INVENTION

The present general inventive concept provides an apparatus capable of converting an analog audio signal to a digital audio signal and outputting the digital audio signal through a SONY®/PHILIPS® digital interface (SPDIF), such that a user who utilizes a dedicated receiver having a digital audio digital signal processor (DSP) therein is able to listen to the analog audio signal through an external speaker.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing an analog/digital audio converting apparatus usable with a digital broadcasting receiving apparatus, the analog/digital audio converting apparatus comprising an audio decoder to select and output at least one of input analog audio signals, an output device to separate a digital audio signal from input signals of the digital broadcasting receiving apparatus and to output the separated signal as a first digital audio signal, a formatter to process the analog audio signal output from the audio decoder and to output the processed signal as a second digital audio signal, and a digital audio processing device to select and output one of the first digital audio signal output from the output device and the second digital audio signal output from the formatter.

The digital audio processing device may select and output one of the first and the second digital audio signals according to a selecting signal input externally. Alternatively, the digital audio processing device may select the second digital audio signal output from the formatter upon receiving a signal to select the signal output from the audio decoder.

At least one of the analog audio signals input to the audio decoder may be an analog audio signal output from the digital broadcasting receiving apparatus or an analog audio signal input from an external device. The first and the second digital audio signals may be SONY®/PHILIPS® digital interface (SPDIF) signals.

The formatter may be disposed within the digital audio processor, such that the analog audio signal output from the audio decoder is processed into the second digital audio signal, and one of the first and the second digital audio signals is selectively output.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
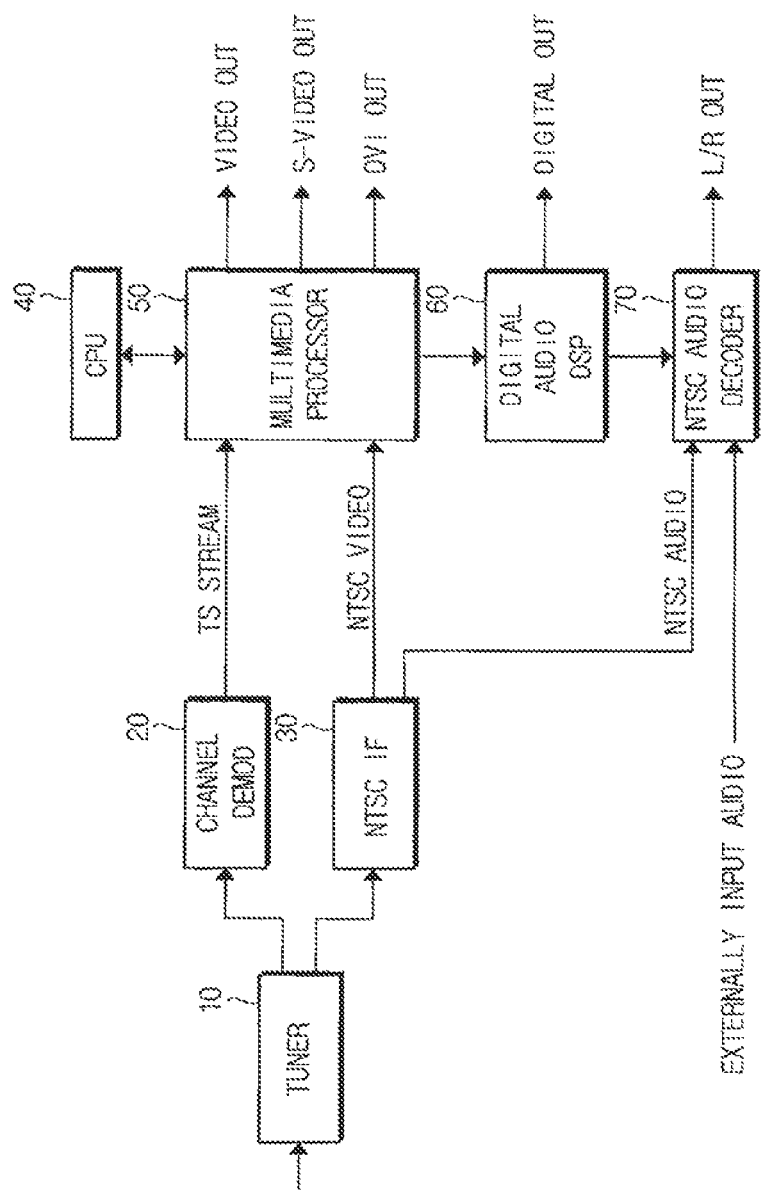
FIG. 1 is a block diagram of a conventional digital broadcasting receiving apparatus for processing a SONY®/PHILIPS® digital interface.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
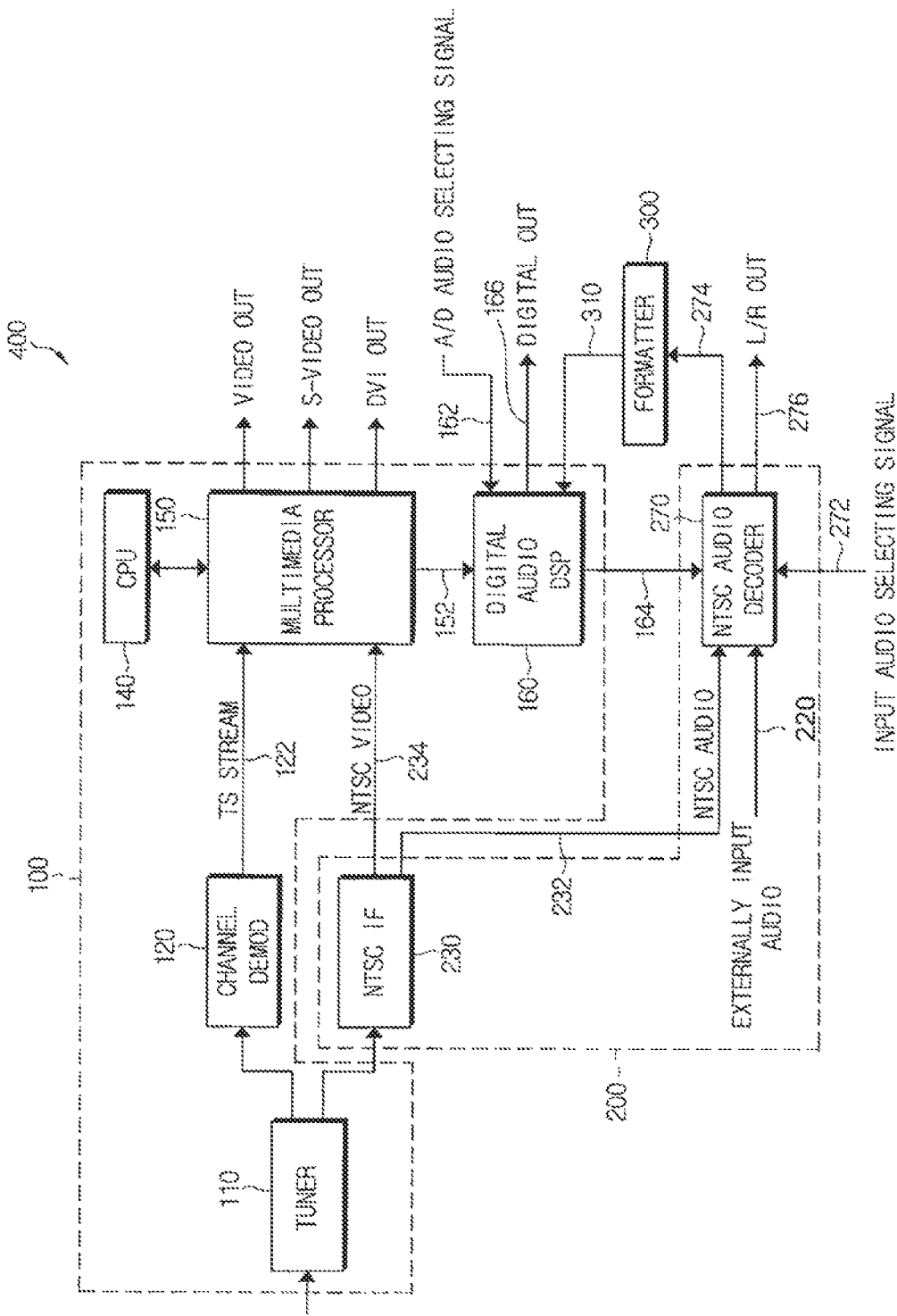
FIG. 2 is a block diagram illustrating a digital broadcasting receiving apparatus according to an embodiment of the present general inventive concept.

FIG. 2 is a block diagram illustrating a digital broadcasting receiving apparatus 400 according to an embodiment of the present general inventive concept.

Referring to FIG. 2, the digital broadcasting receiving apparatus 400 comprises a digital processing part 100, an analog processing part 200, and a formatter 300 to convert an audio signal output from the analog processing part 200 into a digital signal and to input the converted signal into the digital processing part 100.

The digital processing part 100 comprises a tuner 110 to receive a predetermined channel from an external sky wave, a cable, and a satellite, a channel demodulator (demod) 120 to process an intermediate frequency (IF) corresponding to the channel and to output a transport stream (TS) 122, a multimedia processor 150 including therein a TS demultiplexer (demux), a moving picture experts group (MPEG) decoder, and a graphic mixer, a controller (CPU) 140 to control the overall system, and a digital audio processor 160 (hereinafter, referred to as "digital audio DSP") to receive a first digital audio signal 152 output from the multimedia processor 150 and to process the received first digital audio signal 152. Here, the multimedia processor 150 processes and outputs the TS 122 as an image through a video output or a super-video (S-video) output or as a digital video interactive (DVI) output which is a type of compressed data used to record a moving image as digital data, and separates a digital audio signal from received signals of the TS stream 122 to output the separated digital audio signal as the first digital audio signal 152.

The digital audio DSP 160 processes and outputs the first digital audio signal 152 through a SONY®/PHILIPS® digital interface (SPDIF) externally as a digital output signal 166, thereby enabling a user who utilizes an external receiver (not shown) to receive and listen to the digital output signal 166. More specifically, the SPDIF of the digital audio DSP 160 can be connected to an input terminal of the external receiver and the digital output signal 166 can be decoded at a digital audio DSP of the external receiver. Accordingly, the user can listen to sound corresponding to the digital output signal 166 through an external speaker, such as earphones. Further, the digital audio DSP 160 is constructed to decode the first digital audio signal 152 output from the multimedia processor 150, separately output the decoded signal as different types of audio data, convert the output audio data into an analog audio signal, synthesize the analog audio signal as a multi-channel audio signal 164 and output the multi-channel audio signal 164 to a national television system committee (NTSC) audio decoder 270, which will be explained in greater detail below, so that the sound can be listened to through the external speaker.

Also, an analog/digital audio selecting signal 162 is input an external source to select one of the first digital audio signal 152 and a second digital audio signal 310 input from the formatter 300. The digital audio DSP 160 outputs the selected signal as the digital output signal 166.

The analog processing part 200 comprises an NTSC IF decoder 230 and the NTSC audio decoder 270. The NTSC IF decoder 230 amplifies the IF signal corresponding to the channel received by the tuner 110 and separates the amplified IF signal into an NTSC audio signal 232 and an NTSC video signal 234. The NTSC IF decoder 230 outputs the separated NTSC video signal 234 to the multimedia processor 150 and the separated NTSC audio signal 232 to the NTSC audio decoder 270. The NTSC audio decoder 270 receives an input audio selecting signal 272, which is to select any one of the separated NTSC audio signal 232, an externally-input audio signal 220, and the multi-channel audio signal 164 output from digital audio DSP 160, amplifies the audio signal selected by the input audio selecting signal 272, and outputs the amplified signal as a left/right (L/R) output signal 276, to transmit the left/right (L/R) output signal 276 to an external speaker. In addition, the NTSC audio decoder 270 outputs the amplified signal as an NTSC audio signal 274 to the formatter 300 in order to digitally convert the selected audio signal.

The formatter 300 receives the NTSC audio signal 274 output from the NTSC audio decoder 270, processes the NTSC audio signal 274 to convert the NTSC audio signal 274 into the second digital audio signal 310 to be input into the digital audio DSP 160. Here, the NTSC audio signal 274 may be the same as the L/R output signal 276 output from the NTSC audio decoder 270.

The formatter 300 converts the input NTSC audio signal 274 into the second digital audio signal 310 using an analog/digital (A/D) converter, compresses and outputs the second digital audio signal 310 to the digital audio DSP 160, which can output the second digital audio signal 310 as the digital output signal 166 according to the analog/digital selecting signal 162. The formatter 300 may have various types of structure to receive and digitally output various analog audio signals. The formatter 300 may alternatively be disposed inside the digital audio DSP 160 instead of separately provided, as illustrated in FIG. 2. In other words, the digital audio DSP 160 can be capable of converting and outputting an input analog audio signal as a digital audio signal, and the NTSC audio signal 274 output from the NTSC audio decoder 270 can be directly input to the digital audio DSP 160 to be processed therein.

In the digital broadcasting receiving apparatus 400, as described above, even while the digital output signal 166 output from the digital audio DSP 160 externally is received through the external receiver (not shown), if the user selects the analog audio by operating the A/D audio selecting signal 162, the digital audio DSP 160 can select the second digital audio signal 310 output from the formatter 300, thereby enabling the user to digitally listen to the analog audio through the external receiver.

Herein, the second digital audio signal 310 output from the formatter 300 corresponds to the selected one of the NTSC audio signal 232 separated from the NTSC IF decoder 230, the externally-input audio signal 220, and the multi-channel audio signal 164 output from the digital audio DSP 160, according to the input audio selecting signal 272. Thus, the user can select the analog audio signal (NTSC audio signal 274) as desired, by operating the input audio selecting signal 272.

Accordingly, the formatter 300 to convert the selected analog audio signal 274 into the second digital audio signal 310 enables listening to the selected analog audio signal 274 or the second digital audio signal through the external receiver as desired by the user, without inconveniences of a conventional digital broadcasting receiving apparatus, such as having to listen to the sound only through the external receiver and change the channel to an analog channel when receiving a digital broadcasting, and having to convert to an internal speaker to connect to an external device, such as video cassette recorder (VCR).

As described above, in a digital outputting apparatus usable with an analog audio signal according to the present general inventive concept, when receiving an analog broadcasting signal through a digital broadcasting receiving apparatus or through an external device, such as VCR, a user utilizing a dedicated receiver including a digital audio DSP therein can receive and listen to sound through an external speaker.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A digital broadcasting receiving apparatus, comprising:
   a first input configured to receive a digital broadcasting signal;
   a second input configured to receive an analog input signal;
   a processor configured to:
      in response to the digital broadcasting signal being received via the first input, generate a first digital audio signal and a first analog audio signal based on the digital broadcasting signal,
      in response to the analog input signal being received via the second input, generate a second analog audio signal based on the analog input signal and a second digital audio signal based on the second analog audio signal;
   an analog audio output configured to output analog audio signal corresponding to one of the first analog audio signal and the second analog audio signal generated by the processor; and
   a digital audio output configured to output digital audio signal corresponding to one of the first digital audio signal and the second digital audio signal generated by the processor.

2. The digital broadcasting receiving apparatus of claim 1, further comprising an internal speaker configured to output sound corresponding to the analog audio signal.

3. The digital broadcasting receiving apparatus of claim 2, wherein the processor is configured to mute an output of the internal speaker while the one of the first digital audio signal and the second digital audio signal is output via the digital audio output.

4. The digital broadcasting receiving apparatus of claim 3, wherein the processor is configured to mute the output of the internal speaker by setting a volume of the internal speaker to zero.

5. The digital broadcasting receiving apparatus of claim 1, wherein the digital audio output is a SONY/PHILIPS digital interface (SPDIF).

6. The digital broadcasting receiving apparatus of claim 1, wherein the processor determines which of the first digital audio signal and the first analog audio signal to generate according to the digital broadcasting signal, and
   the processor determines which of the second analog audio signal and the second digital audio signal to generate according to the analog input signal.

7. The digital broadcasting receiving apparatus of claim 1, wherein the analog audio output is configured to output the analog audio signal according to a first selection information, and
   the digital audio output is configured to output the digital audio signal according to a second selection information.

8. The digital broadcasting receiving apparatus of claim 1, wherein, in response to the analog input signal being received via the second input while the first digital audio signal is output via an external speaker connected with the digital audio output, the digital audio output is configured to output the second digital audio signal to output the second digital audio signal via the external speaker.

9. An audio outputting method of a broadcasting receiving apparatus including a processor, a first input, a second input, an analog audio output and a digital audio output, the method comprising:
   in response to a digital broadcasting signal being received via the first input, generating, by the processor, a first digital audio signal and a first analog audio signal based on the digital broadcasting signal;
   in response to an analog input signal being received via the second input, generating, by the processor, a second analog audio signal based on the analog input signal and a second digital audio signal based on the second analog audio signal;

outputting, via the analog audio output, analog audio signal corresponding to one of the first analog audio signal and the second analog audio signal generated by the processor; and muting the outputting of the analog audio signal while digital audio signal corresponding to one of the first digital audio signal and the second digital audio signal generated by the processor is being output via the digital audio output.

10. The audio outputting method of claim 9, wherein the broadcasting receiving apparatus further comprises an internal speaker, and the method further comprises:
outputting, via the internal speaker, sound corresponding to the analog audio signal.

11. The audio outputting method of claim 10, wherein the muting comprises setting a volume of the internal speaker to zero.

12. The audio outputting method of claim 9, further comprising:

in response to the analog input signal being received via the second input while the first digital audio signal is output via an external speaker connected with the digital audio output, outputting the second digital audio signal to output the second digital audio signal via the external speaker.

13. The audio outputting method of claim 9, wherein the digital audio output is a SONY/PHILIPS digital interface (SPDIF).

14. The audio outputting method of claim 9, wherein analog audio output outputs the analog audio signal according to a first selection information, and the digital audio output outputs the digital audio signal according to a second selection information.

15. A broadcasting receiving apparatus, comprising:
an internal speaker;
a tuner configured to receive a digital broadcasting signal and an analog broadcasting signal;
a processor configured to:
in response to the digital broadcasting signal being received via the tuner, generate a first digital audio signal and a first analog audio signal based on the digital broadcasting signal,
in response to the analog broadcasting signal being received via the tuner, generate a second analog audio signal based on the analog broadcasting signal and a second digital audio signal based on the second analog audio signal,
an analog audio output configured to output analog audio signal corresponding to one of the first analog audio signal and the second analog audio signal generated by the processor, via the internal speaker; and a digital audio output configured to output digital audio signal corresponding to one of the first digital audio signal and the second digital audio signal generated by the processor.

16. The broadcasting receiving apparatus of claim 15, wherein the internal speaker is configured to output the one of the first analog audio signal and the second analog audio signal according to a first selection information, and the digital audio output is configured to output the one of the first digital audio signal and the second digital audio signal according to a second selection information.

17. The broadcasting receiving apparatus of claim 15, wherein the processor is configured to mute an output of the internal speaker while the one of the first digital audio signal and the second digital audio signal is output via the digital audio output.

18. The broadcasting receiving apparatus of claim 17, wherein the processor is configured to mute the output of the internal speaker by setting a volume of the internal speaker to zero.

19. The broadcasting receiving apparatus of claim 15, wherein the digital audio output is a SONY/PHILIPS digital interface (SPDIF).

20. The broadcasting receiving apparatus of claim 15, wherein the broadcasting receiving apparatus further comprises an analog input, the processor is configured to, in response to an analog input signal being received via the analog input, generate a third analog audio signal based on the analog input signal and a third digital audio signal based on the third analog audio signal,
the analog audio output configured to output analog audio signal corresponding to one of the first analog audio signal, the second analog audio signal and the third analog audio signal to output audio corresponding to one of the first analog audio signal, the second analog audio signal and the third analog audio signal via the internal speaker, and
the digital audio output configured to output digital audio signal corresponding to one of the first digital audio signal, the second digital audio signal and the third digital audio signal.

21. The digital broadcasting receiving apparatus of claim 20, wherein in response to the analog input signal being received via the analog input while the generated one of the first digital audio signal and the second digital audio signal is output via an external speaker connected with the digital audio output, the digital audio output is configured to output the third digital audio signal to output the third digital audio signal via the external speaker.

* * * * *

UNITED STATES PATENT AND TRADEMARK OFFICE
CERTIFICATE OF CORRECTION

PATENT NO. : 10,809,967 B2  
APPLICATION NO. : 15/390190  
DATED : October 20, 2020  
INVENTOR(S) : Tae-yong Son Page 1 of 1

It is certified that error appears in the above-identified patent and that said Letters Patent is hereby corrected as shown below:

On the Title Page

Item [56] (References Cited), Line 15 (approx.):
Delete "AudioNideo" and insert -- Audio/Video --, therefor.

In the Claims

Column 8, Line 43 (approx.):
In Claim 21, after "The" delete "digital".

Signed and Sealed this  
Fifth Day of January, 2021

Andrei Iancu  
*Director of the United States Patent and Trademark Office*